United States Patent Office 3,080,234
Patented Mar. 5, 1963

3,080,234
METHOD OF IMPROVING THE EFFICIENCY OF AMINO ACID DIETS
Charles I. Jarowski, Massapequa Park, N.Y., assignor to Chas. Pfizer & Co., Inc., New York, N.Y., a corporation of Delaware
No Drawing. Filed Dec. 6, 1960, Ser. No. 74,012
5 Claims. (Cl. 99—14)

This invention relates to amino acid nutrition and more particularly to balanced foodstuffs and methods for improving dietary amino acid utilization.

It is well known that various amino acids are essential for normal growth and well-being in animals, including man. Since they cannot be synthesized by the body in adequate quantity, they must be provided in free or combined form in the diet to meet the requirements of cellular protein synthesis and to fulfill other metabolic roles. For most animals studied it is generally agreed that the essential amino acids include arginine, histidine, isoleucine, leucine, lysine, methionine, phenylalanine, threonine, tryptophan and valine, although in man the first two are regarded as non-essential. It is also known that a part of the methionine requirement can be replaced by cystine, and a part of the phenylalanine requirement by tyrosine. This information is obviously very useful in evaluating potential dietary sources of protein. Thus, for example, gelatin, which contains no tryptophan, is clearly inadequate as a sole source of dietary protein.

For optimum nutrition, however, it is desirable that the amino acid requirements of the body be placed on a more quantitative basis, so that the essential amino acids can be provided in the daily diet in the proper proportions. If a poor protein is ingested, large excesses of some amino acids will have to be metabolized and excreted, whereas others will be in such short supply that the body's amino acid reserve will be partially consumed. Many attempts have been made to establish approximate quantitative requirements by elaborate experimentation. Unfortunately, however, it is found that these requirements seem to vary with species, and, to a lesser extent, with age and sex. Furthermore, there is some variation in amino acid requirement from individual to individual. Conclusions drawn from an empirical approach, observing the effect of varying one amino acid while the others are held constant, are necessarily restricted in their applicability. Progress in these studies has been hampered by the complexity of the problem and the time-consuming and expensive testing which has seemed necessary.

Now it has been discovered that a close interrelationship exists between dietary amino acid requirements and the amino acid content of the blood plasma. Although the amino acid content of the plasma is found to change shortly after eating, determination made upon fasting, e.g. about 18 hours after eating, are remarkably reproducible. It has been found that important advantages may be achieved by supplying to an animal, including man, a diet whose relative proportions of nutritionally available amino acids conform substantially to the respective proportions of these acids as found in that animal's fasting blood plasma. By "nutritionally available amino acid" is meant amino acid which is present in the diet in such forms as are utilizable by the body. These include free amino acids, their salts, and digestible protein.

Diets determined in accordance with the present invention often permit more efficient food utilization. The highest efficiency in conversion to protein results where the amino acids are provided in properly balanced proportions, such that large excesses are avoided while fasting reserves are not drained. Diets balanced in this manner can provide higher efficiency, i.e. higher ratios of weight gain to food consumption. They can likewise provide more rapid increase in body weight and protein.

As previously stated, there is some variation between individuals in what may be termed the "amino acid profile," that is, the pattern of relative amino acid proportions in the plasma. However, excellent results may be obtained by the substantial conformity of diet to profile afforded by basing the diet on the average plasma values for the species. The amino acid plasma concentrations for many species are readily available in standard reference works. Where desired, however, experimental values may be determined by established procedures. For example, blood samples may be drawn from a homogeneous group of animals after fasting, treated with heparin to delay clotting, pooled, and freed of red cells. The composite plasma sample may then be treated with picric acid to remove proteins and the amino acid levels determined by the ion-exchange procedure of Moore and Stein (Journal of Biological Chemistry, 211, page 893, 1954).

One of the important applications of the present invention lies in the supplementation of conventional low-cost feedstuffs such as cornmeal or other grains. Such supplementation provides better amino acid balance while conserving the available protein supply by more efficient utilization.

Of course, in diet supplementation it may not always be economically practical to bring the relative proportions of all the essential amino acids into complete conformity with the fasting plasma proportions. Important advantages may still be achieved if the essential amino acids present in most limiting proportion in the diet are so adjusted. It will be understood that the first limiting amino acid is that one which is present in the basic diet in the smallest proportion relative to the amino acid profile. The diet is supplemented with respect to the first limiting amino acid to the extent that its total proportion in the dietary protein will balance with the proportion of the second limiting amino acid. When this has been achieved, supplementation with both the first and second limiting amino acids follows, in sufficient quantity to achieve balance with the third limiting amino acid. This process may be continued even further if desired or economically practical, until all the essential amino acids are in proper balance. The procedure will perhaps be more clearly understood by reference to the table and discussion which follow.

|  | A | B | C | D | E | F | G |
|---|---|---|---|---|---|---|---|
|  | Plasma level, mmoles ×10³ per l. | Peanut meal, mmoles per 100 g. | B/A | Peanut meal plus lysine | D/A | Peanut meal plus lysine, tryptophan, threonine | F/A |
| Arginine | 146 | 70.4 | 0.48 | 68 | 0.47 | 59.4 | 0.41 |
| Histidine | 62 | 18.0 | 0.29 | 17.4 | 0.28 | 15.2 | 0.24 |
| Isoleucine | 60 | 35.8 | 0.60 | 34.6 | 0.58 | 30.2 | 0.50 |
| Leucine | 100 | 53.0 | 0.53 | 51.2 | 0.51 | 44.7 | 0.44 |
| Lysine | 389 | 28.0 | 0.07 | 45.0 | 0.12 | 87.0 | 0.22 |
| Methionine plus cystine | 52 | 14.0 | 0.27 | 13.5 | 0.26 | 11.8 | 0.23 |
| Phenylalanine plus tyrosine | 115 | 57.6 | 0.50 | 55.6 | 0.48 | 48.6 | 0.42 |
| Threonine | 199 | 25.8 | 0.13 | 24.9 | 0.13 | 44.4 | 0.22 |
| Tryptophan | 54 | 6.2 | .12 | 6.0 | 0.11 | 12.0 | 0.22 |
| Valine | 101 | 48.6 | 0.48 | 47.0 | 0.47 | 41.0 | 0.41 |

In column A above is shown the amino acid content of a pooled sample of plasma drawn from 20 Sprague-Dawley rats after an 18-hour fast; and in column B is shown the available amino acid content of 100 grams of a peanut meal feed containing adequate vitamins, minerals and carbohydrate to satisfy metabolic requirements. While both quantities are expressed in terms of millimoles per unit quantity it would be equally satisfactory to express the values in grams per unit quantity. Column C represents the ratio of the amino acid content of the proposed feed and of the rat plasma, obtained by dividing the values in column B by the values in column A. It is noted at once that lysine is the first limiting amino acid, i.e. its ratio in feed to plasma is lowest. Accordingly, if peanut meal is fed to the rats they will have to consume a substantial excess of the other nine amino acids to obtain sufficient lysine to meet their minimum requirements.

In column D is shown the composition (millimoles per 100 grams) of a peanut meal feed fortified with about 19 millimoles or 3.4 grams L-(+) lysine monohydrochloride per 100 grams, and in column E is shown the ratio of the amino acid contents of the fortified feed and the rat plasma, obtained by dividing the values in column D by the values in column A. It will be seen that the amount of added lysine has been selected to raise the lysine ratio to substantial equality with the ratio of the second limiting amino acid. Actually there were two "second limiting amino acids," namely tryptophan and threonine, as will be observed from their substantially equal values in column C. Now the rats need consume only seven instead of nine amino acids in excess in order to satisfy their requirements for the limiting acids lysine, tryptophan and threonine. Higher feed efficiency may thereby be obtained.

The next limiting amino acids are methionine and histidine. An improved feedstuff can be formulated by adding sufficient tryptophan, threonine and further lysine to balance with these two. In column F is shown a peanut meal fortified with the following proportions of amino acids:

Lysine, 13.6 g. or 75 mmoles per 100 g. peanut meal
Tryptophan, 1.6 g. or 8 mmoles per 100 g. peanut meal
Threonine, 3.2 g. or 26.8 mmoles per 100 g. peanut meal Column G, obtained by dividing the values in column F by the values in column A, presents the ratios of the respective amino acid concentrations in the fortified feed to their concentrations in the rat plasma. It is now seen that ratios of histidine, lysine, methionine, threonine and tryptophan are substantially in balance and smaller excesses of the remaining five acids need be consumed to satisfy minimum requirements. An inspection of columns C and G shows that what was a nine-fold excess of isoleucine with respect to lysine (0.60/0.07) has been reduced to only a two-fold excess (0.50/0.22). A substantial increase in feed efficiency is thereby afforded. Further refinements in the diet can obviously be made by further supplementation along the lines described. However, in many cases the added improvement to be gained will be smaller than that already achieved. While some improvement is provided by merely supplementing with the first limiting amino acid, ordinarily it will be preferred to supplement at least the first and second limiting amino acids so as to bring them into substantial balance with the third. In this manner important gains in protein efficiency may be achieved at relatively low cost.

Other applications of the invention will readily occur to those skilled in the art. For example, two or more complementary protein sources may be blended in such proportions as to minimize their respective amino acid deficiencies and to reduce if not eliminate the amino acid supplementation required. Such protein sources may include, for example, corn meal, cottonseed meal, soybean meal, peanut meal, sesame meal, sunflower meal, alfalfa, casein, milk, wheat gluten, gelatin and the like.

Furthermore, concentrated foods can be prepared comprising mixtures of the amino acids in such proportions as to conform substantially to their respective proportions in the fasting plasma, together with adequate concentrations of vitamins, minerals and carbohydrate to satisfy established requirements. Such diets may be administered with water during periods of illness, recuperation, or stress, or where weight or space considerations make conventional food temporarily impractical. Sterile solutions suitable for intravenous feeding may be formulated in similar manner, by combining pure amino acids, by fortifying protein hydrolysates with amino acids, or by combining various protein hydrolysates in a physiologically acceptable aqueous medium and in suitable proportions to conform substantially to the amino acid profile determined in the plasma upon fasting. Such solutions may, if desired, also contain carbohydrate, e.g. dextrose or fructose, and salts, e.g. sodium chloride, and are suitable for intravenous feeding where the patient is temporarily unable to ingest or digest food so as to maintain a favorable nitrogen balance.

The following examples are provided for purposes of illustration and should not be interpreted as limiting the invention, the scope of which is indicated by the appended claims.

EXAMPLE I

The following liquid diet, a 50% w./v. aqueous solution found to be highly efficient in prior art studies such as those described by Greenstein et al. in Archives of Biochemistry and Biophysics, vol. 72, p. 396 (1957), is prepared, employing amino acids in the form of their L-isomers:

Diet A

Arginine HCl _____g__ 9.4
Histidine HCl.H$_2$O _____g__ 5.7
Isoleucine _____g__ 8.8

*Diet A—Continued*

| | |
|---|---|
| Leucine | g-- 14.0 |
| Lysine HCl | g-- 13.0 |
| Methionine | g-- 6.3 |
| Phenylalanine | g-- 6.3 |
| Threonine | g-- 8.8 |
| Tryptophan | g-- 2.8 |
| Valine | g-- 9.8 |
| Tyrosine ethyl HCl | g-- 16.8 |
| Alanine | g-- 6.4 |
| Aspartic acid | g-- 13.5 |
| Sodium glutamate | g-- 51.2 |
| Glycine | g 4.1 |
| Proline | g-- 25.4 |
| Serine | g-- 13.2 |
| Cysteine ethyl HCl | g-- 1.1 |
| NaOH | g-- 4.1 |
| Dextrose | g-- 637.1 |
| NaCl | g-- 4.8 |
| Mineral soln. A | ml-- 100 |
| Mineral soln. B | ml-- 50 |
| Choline chloride | g-- 2.5 |
| Ca fructose 1,6-diphosphate | g-- 50.5 |
| Vitamin mixture (H$_2$O-soluble) | g-- 50 |
| Polysorbate 80 [1] | g-- 6 |
| Vitamin soln. (fat-soluble) | ml-- 1 |
| Ethyl linoleate | g-- 4 |

Water to make 2 liters.

[1] Polyoxyethylene ether of sorbitan mono-oleate, nonionic surface active agent.

Mineral solution A in the above diet has the following composition:

| | G. |
|---|---|
| Glucono delta lactone | 26.1 |
| Magnesium oxide | 0.73 |
| KOH | 6.17 |
| Ferrous gluconate | 1.72 |

Water to make 100 ml.

The composition of mineral solution B is as follows:

| | Mg. |
|---|---|
| Mn(C$_2$H$_3$O$_2$)$_2$.4H$_2$O | 260 |
| Cu(C$_2$H$_3$O$_2$)$_2$.H$_2$O | 15 |
| Co(C$_2$H$_3$O$_2$)$_2$.4H$_2$O | 9 |
| Zinc benzoate | 22 |
| (NH$_4$)$_6$Mo$_7$O$_{24}$.4H$_2$O | 6 |
| KI | 30 |

Water to make 50 ml.

The mixture of water-soluble vitamins in the diet consists of the following ingredients per 100 grams:

| | |
|---|---|
| Thiamine HCl | mg-- 20.1 |
| Riboflavin | mg-- 15.1 |
| Pyridoxine HCl | mg-- 12.6 |
| Niacin | mg-- 75.1 |
| Inositol | mg-- 500.1 |
| Calcium pentathenate | mg-- 100.1 |
| Biotin | mg-- 0.67 |
| Folic acid | mg-- 1.15 |
| Ascorbic acid | mg-- 1000 |
| Vitamin B$_{12}$ | mg-- 0.2 |
| p-Aminobenzoic acid | mg-- 600 |
| Glucose | grams-- 97.67 |

The solution of fat-soluble vitamins employed in the diet formulation contains the following ingredients per milliliter:

| | Mg. |
|---|---|
| Vitamin A acetate | 10 |
| Vitamin K | 4.2 |
| Vitamin D | 7 |
| Vitamin E | 50 |

In absolute ethanol.

If the relative proportions of essential amino acids in this diet are compared with their respective proportions in the plasma of fasting rats, it is noted that the diet is most deficient with respect to lysine, followed by tryptophan, arginine, threonine, and histidine; i.e. the ratios of the concentrations of these acids in the diet to their concentrations in the plasma are lowest, as shown in the table below.

| | A<br>Plasma level, mmoles× 10$^3$ per liter | B<br>Diet A mmoles per liter | B/A |
|---|---|---|---|
| Arginine | 146 | 22 | 0.15 |
| Histidine | 62 | 14 | 0.23 |
| Isoleucine | 60 | 33 | 0.55 |
| Leucine | 100 | 53 | 0.53 |
| Lysine | 389 | 36 | 0.09 |
| Methionine | 52 | 21 | 0.40 |
| Phenylalanine | 58 | 19 | 0.33 |
| Threonine | 199 | 37 | 0.19 |
| Tryptophan | 54 | 6.7 | 0.12 |
| Valine | 101 | 42 | 0.42 |

*Diet B*

A second diet is formulated, in all respects identical with Diet A except that the concentrations of the five limiting amino acids are raised to the following values (per two liters of solution):

| | G. |
|---|---|
| Arginine HCl | 19.7 |
| Histidine HCl.H$_2$O | 8.0 |
| Lysine HCl | 46.8 |
| Threonine | 15.8 |
| Tryptophan | 7.3 |

Since this change represents an increase of 57.9 grams, the dextrose content of Diet B is reduced by the same amount, from 637.1 to 579.2 grams per 2 liters, so that the two diets are substantially isocaloric, and so that the 50% w./v. concentration is adhered to.

The relative proportions of these amino acids in Diet B and in plasma are compared in the table below.

| | A<br>Plasma level, mmoles× 10$^3$ per liter | B<br>Diet B mmoles per liter | B/A |
|---|---|---|---|
| Arginine | 146 | 47 | 0.32 |
| Histidine | 62 | 19 | 0.31 |
| Lysine | 389 | 128 | 0.33 |
| Threonine | 199 | 66 | 0.33 |
| Tryptophan | 54 | 18 | 0.33 |

The ratios for the five limiting amino acids have thus been raised to substantial equality with the ratio for the sixth limiting acid, phenylalanine.

Separate groups of male weanling Sprague-Dowley rats are maintained on Diets A and B as their sole source of nourishment. Each group consists of 12 rats having an average weight of 47.9 grams at the start of the experiment. As described by Greenstein (loc. cit.), known volumes of solution are placed in inverted drinking tubes and the animals are permitted to imbibe ad libitum.

The daily consumption of liquid diet by each animal is recorded, and the weight gains are determined periodically. Results obtained are as follows:

Diet A

| Days | A<br>Avg. daily weight gain per animal, g. | B<br>Avg. daily diet consumed per animal, ml. | C<br>Daily solids consumed per animal = B/2, g. | Efficiency = A/C |
|---|---|---|---|---|
| 1-3 | 2.7 | 10.6 | 5.3 | 0.51 |
| 4-6 | 3.2 | 15.0 | 7.5 | 0.43 |
| 7-10 | 2.8 | 15.7 | 7.8 | 0.35 |
| 11-14 | 2.8 | 15.7 | 7.8 | 0.35 |
| Overall | | | | 0.40 |

Diet B

| Days | A<br>Avg. daily weight gain per animal, g. | B<br>Avg. daily diet consumed per animal, ml. | C<br>Daily solids consumed per animal = B/2, g. | Efficiency = A/C |
|---|---|---|---|---|
| 1-3 | 2.8 | 10.1 | 5.0 | 0.56 |
| 4-6 | 3.7 | 15.2 | 7.6 | 0.49 |
| 7-10 | 2.8 | 16.8 | 8.4 | 0.33 |
| 11-14 | 4.0 | 16.8 | 8.4 | 0.48 |
| Overall | | | | 0.46 |

Thus Diet B proves 15% more efficient than Diet A in this experiment. Since Diet B contains 32.5 grams of amino acid nitrogen per 2 liters, as compared with 25.2 grams for Diet A, it is questioned whether the increased efficiency may be attributed to this higher nitrogen content. The amino acid content of Diet A is therefore increased at the expense of the dextrose to a value equivalent to 32.5 grams of nitrogen per 2 liters, without, however, altering the relative proportions of amino acids. When this diet is tested as described it fails to provide any increased efficiency over that of Diet A, demonstrating that the higher efficiency of Diet B results from matching the proportions of the six limiting amino acids to their proportions in the rat plasma.

Diet C

A third diet is formulated, identical with Diet A except that the concentrations of the first two limiting amino acids are raised to the following values (per two liters of solution):

| | G. |
|---|---|
| Lysine HCl | 21.5 |
| Tryptophan | 3.3 |

This change represents an increase of 9 grams over Diet A, and accordingly the dextrose content is reduced by the same amount, from 637.1 to 628.1 grams per 2 liters.

The relative proportions of these amino acids in Diet C and in the fasting plasma are as follows:

| | A<br>Plasma level, mmoles×10³ per liter | B<br>Diet C mmoles per liter | B/A |
|---|---|---|---|
| Lysine | 389 | 59 | 0.15 |
| Tryptophan | 54 | 8.1 | 0.15 |

The ratios for the two limiting amino acids have thus been raised to substantial equality with the ratio for the third limiting acid, arginine. This adjusted diet, like Diet B, is found to be nutritionally more efficient than Diet A when tested as previously described for the other diets.

EXAMPLE II

The levels of essential amino acids in fasting chicken plasma are determined as previously described. A corn meal is then supplemented for the feeding of chickens by incorporation therein of 1.13 g. lysine hydrochloride, 0.83 g. threonine and 0.26 g. arginine hydrochloride per 100 g. of meal. The content of available essential amino acids in the feed before and after supplementation is compared with the amino acid profile of the chickens in the table below.

| | A<br>Plasma level, mmoles per liter | B<br>Corn meal mmoles per 100 g. | C<br>B/A | D<br>Enriched meal, mmoles per 100 g. | E<br>D/A |
|---|---|---|---|---|---|
| Arginine | 0.352 | 2.30 | 6.5 | 3.44 | 10 |
| Histidine | 0.126 | 1.48 | 12 | 1.45 | 12 |
| Isoleucine | 0.225 | 3.12 | 14 | 3.05 | 14 |
| Leucine | 0.253 | 7.85 | 31 | 7.68 | 30 |
| Lysine | 0.837 | 2.19 | 2.6 | 8.19 | 10 |
| Methionine | 0.083 | 0.80 | 10 | 0.78 | 9 |
| Phenylalanine | 0.119 | 2.30 | 19 | 2.25 | 19 |
| Threonine | 0.982 | 2.85 | 2.9 | 9.60 | 10 |
| Tryptophan | 0.025 | 0.34 | 14 | 0.33 | 13 |
| Valine | 0.231 | 3.50 | 15 | 3.42 | 15 |

It is apparent from the table that the available amino acid content of the enriched meal conforms much more closely to the amino acid profile of the chickens than does the corn meal base. Inspection of columns C and E shows that what was a twelve-fold excess of leucine with respect to lysine (31/2.6) has been reduced to only a three-fold excess (30/10). The supplemented corn meal is a more efficient feed for these chickens than the unsupplemented meal.

EXAMPLE III

The levels of essential amino acids in human plasma are determined as described. A quantity of casein is then enriched for human feeding by incorporation therein of 8.6 g. lysine hydrochloride
6.0 g. methionine
3.9 g. threonine
4.7 g. tryptophan
7.1 g. valine per 100 g. casein. The content of available essential amino acids in the casein before and after enrichment is compared with human plasma levels in the following tabulation:

| | A<br>Plasma level, mmoles per liter | B<br>Casein, mmoles per g. | C<br>B/A | D<br>Enriched casein, mmoles per g. | E<br>D/A |
|---|---|---|---|---|---|
| Isoleucine | 0.062 | 0.440 | 7.1 | 0.338 | 5.5 |
| Leucine | 0.110 | 0.675 | 6.1 | 0.518 | 4.7 |
| Lysine | 0.180 | 0.483 | 2.7 | 0.731 | 4.1 |
| Methionine | 0.118 | 0.210 | 1.8 | 0.469 | 4.0 |
| Phenylalanine | 0.108 | 0.571 | 5.3 | 0.439 | 4.1 |
| Threonine | 0.121 | 0.316 | 2.6 | 0.493 | 4.1 |
| Tryptophan | 0.054 | 0.057 | 1.1 | 0.220 | 4.1 |
| Valine | 0.220 | 0.556 | 2.5 | 0.892 | 4.1 |

The amino acid content of the enriched casein conforms quite closely to the amino acid profile, and what was a six-fold excess of isoleucine with respect to tryptophan (7.1/1.1) has been reduced to only a 1.3-fold excess (5.5/4.1). The enriched casein is an excellent source of amino acids for human nutrition and may, for example, be diluted with water for feeding of premature infants.

EXAMPLE IV

A sterile solution suitable for intravenous human feeding is formulated according to the following proportions:

|  | G. |
|---|---|
| Isoleucin | 2.8 |
| Leucine | 5.0 |
| Lysine HCl | 11.4 |
| Methionine | 6.1 |
| Phenylalanine | 6.2 |
| Threonine | 5.0 |
| Tryptophan | 3.8 |
| Valine | 9.0 |
| Arginine HCl | 0.7 |

Water to make 1000 ml.

The proportions of amino acids in this 5% w./v. solution conform closely to the levels in the human plasma described in the preceding example. The product is particularly well adapted for intravenous feeding of patients unable to ingest or digest food, so as to maintain a favorable nitrogen balance. Caloric content may be increased, if desired, by inclusion of about 5% w./v. alcohol and/or 5–10% w./v. dextrose.

What is claimed is:

1. A method for improving efficiency of amino acid utilization by an animal which comprises administering thereto at least the minimum daily requirement of each essential amino acid, said acids being provided in nutritionally available form and in such amounts that the relative proportions of at least the first three limiting amino acids conform substantially to the respective proportions of said acids found in the blood plasma of said animal upon fasting.

2. A method for improving the nutritional efficiency of a diet which comprises determining the relative proportions of the essential amino acids in the blood plasma of the contemplated recipient of said diet upon fasting and supplementing said diet so as to adjust its nutritionally available content of at least the first three limiting amino acids to substantial conformity with said blood plasma proportions.

3. The method of claim 1 wherein the animal is a human.

4. A method for improving the efficiency of a nutritionally balanced diet comprising vitamins, minerals, carbohydrate and a mixture of the essential amino acids in nutritionally available form, which consists of adjusting the relative proportions of at least the first three limiting amino acids in said diet to conform substantially to the respective proportions of said acids in the fasting blood plasma of the contemplated consumer of said diet.

5. A method for improving the efficiency of a dietary supplement for use with a fixed dietary regimen which consists of adjusting the nutritionally available essential amino acids in said dietary supplement in such proportions that daily consumption of a unit quantity of said supplement in conjunction with the fixed dietary regimen brings the relative proportions of at least the first three limiting amino acids in the combined daily diet into substantial conformity with the respective proportions of said acids in the fasting blood plasma of the recipient of said regimen.

References Cited in the file of this patent

UNITED STATES PATENTS

| 2,344,229 | Block et al. | Mar. 14, 1944 |
| 2,374,407 | Block et al. | Apr. 24, 1945 |
| 2,457,820 | Howe et al. | Jan. 4, 1949 |